(12) United States Patent
Inglin

(10) Patent No.: US 8,459,092 B2
(45) Date of Patent: Jun. 11, 2013

(54) CHECKWEIGHER PERFORMANCE VALIDATION

(75) Inventor: Eric Inglin, Ithaca, NY (US)

(73) Assignee: Mettler-Toledo, LLC, Columbus, OH (US)

( * ) Notice: Subject to any disclaimer, the term of this patent is extended or adjusted under 35 U.S.C. 154(b) by 66 days.

(21) Appl. No.: 13/103,211

(22) Filed: May 9, 2011

(65) Prior Publication Data

US 2012/0285218 A1 Nov. 15, 2012

(51) Int. Cl.
*G01L 25/00* (2006.01)

(52) U.S. Cl.
USPC .......................................................... 73/1.13

(58) Field of Classification Search
None
See application file for complete search history.

(56) References Cited

U.S. PATENT DOCUMENTS

| | | | |
|---|---|---|---|
| 3,318,402 A * | 5/1967 | Kendrick | 177/46 |
| 3,850,023 A | 11/1974 | McDonald | |
| 3,899,915 A | 8/1975 | Williams, Jr. et al. | |
| 4,977,969 A | 12/1990 | Leisinger et al. | |
| 5,148,881 A | 9/1992 | Leisinger et al. | |
| 2002/0052703 A1 | 5/2002 | Tabet | |
| 2008/0047760 A1 | 2/2008 | Georgitsis | |

* cited by examiner

*Primary Examiner* — Robert R Raevis
(74) *Attorney, Agent, or Firm* — Standley Law Group LLP

(57) ABSTRACT

A system and method of validating checkweigher performance (weighing accuracy). The invention involves removing an object to be weighed from a conveyor prior to the object reaching a checkweigher to be validated, weighing the object on a static scale, reintroducing the object to the conveyor upstream of the checkweigher, weighing the object with the checkweigher, and comparing the two weight readings of the object to determine if the checkweigher is accurately weighing objects. Validation objects may be automatically removed from the conveyor by a transfer mechanism.

26 Claims, 6 Drawing Sheets

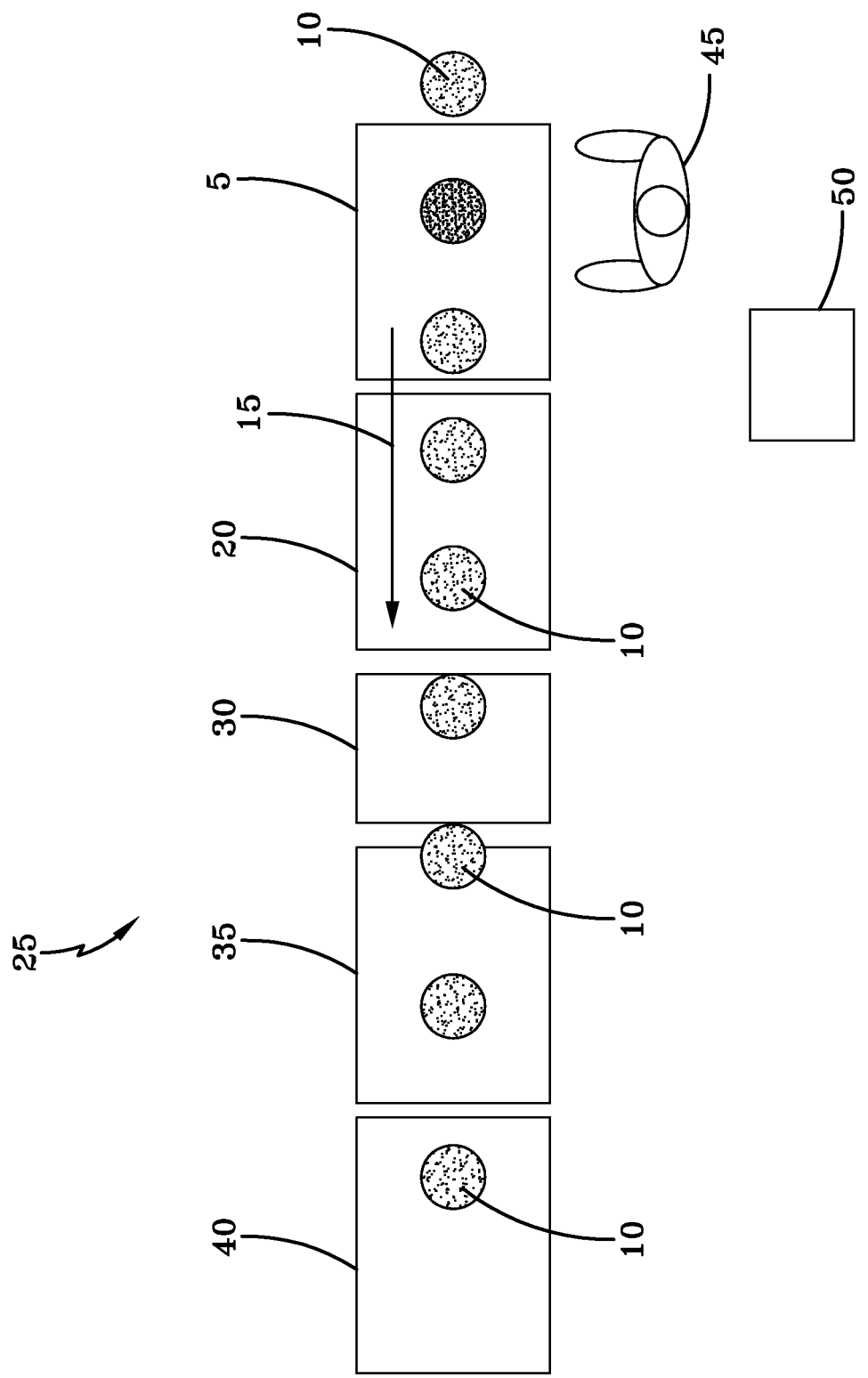

CHECKWEIGHER PERFORMANCE VALIDATION

TECHNICAL FIELD

The present invention is directed to a system and method for validating the proper performance of a checkweigher.

BACKGROUND

The use of checkweighers to weigh moving objects (e.g., packages) is well known, and various checkweigher designs exist for this purpose. In general, however, a checkweigher may be described as a high-speed weighing device for the in-motion weighing of objects as the objects travel along a conveyor. A checkweigher is typically installed to a conveyor line such that an in-feed conveyor is provided for delivering objects to the checkweigher and a discharge conveyor is provided to transport objects from the checkweigher to a downstream location. The checkweigher itself also typically employs a conveyor to transport objects one at a time across a static scale, which is essentially a vertically deflectable mechanism operable to effect weighing of the moving objects.

All checkweighers, in one form or another, employ a sensor that transforms the weight of an object into a usable signal. Typically, this signal is converted into a readable value by some type of analog-to-digital (A/D) converter. Sensors typically used for this purpose include, for example, strain gauge load cells, electromagnetic force restoration weigh cells, or other sensors such as capacitive or inductive sensors.

Regardless of the specific type, all such sensors will, over time, experience a slight change in characteristics. As a consequence, the output of such a sensor in response to a given load will eventually differ from the output of a freshly calibrated sensor in response to the same load. This is particularly true for sensors that are not highly accurate, such as strain gauge load cells. To a lesser degree, this is also true for more accurate sensors, such as electromagnetic force restoration load cells.

In any case, if the characteristics of a sensor change, the readable weight value produced by the sensor will change as well. Therefore, with respect to a checkweigher that employs such a sensor(s), it may be impossible to differentiate between a change in weight of an object over time and a change in sensor characteristics over time, unless samples of the object in question are intentionally removed from the checkweigher line and independently weighed on a static scale.

Thus, known techniques for validating accurate checkweigher (i.e., weight sensor) operation require operator intervention. Typically, such a validation process requires that an operator stop the conveyor line feeding the checkweigher of interest, collect object samples (or a reference sample) to be weighed, weigh the object samples on a static scale, and then run the object samples multiple times (commonly 15 times or more) over the weighing sensor of the checkweigher to validate the weighing function of the checkweigher.

This technique also requires the operator to manually collect and record the associated weight data—both of which occur offline. This data may be collected and may be further archived for reference purposes and/or used to make adjustments to the weight sensor(s) of a checkweigher of interest. Because this is a manual process, a periodic audit function is typically required to ensure that validation checks are being performed.

An alternative checkweigher validation technique involves sampling a set of objects using a built-in sampling function of a checkweigher of interest. Such a sampling operation may typically occur without stopping the associated conveyor line. Generally, the checkweigher rejects the set of sample objects after they are weighed by the checkweigher during such a sampling operation. After being rejected, the sample set of objects must be collected by an operator and transported to an offline static scale for weighing. The weighing function of the checkweigher is then validated by comparing the weights of the objects as reported by the static scale to the weight of the objects as reported by the checkweigher.

One disadvantage of both of the aforementioned checkweigher validation techniques is that that they both require operator intervention. In the former case, all the steps of the validation process must be initiated and performed by an operator. In the latter technique, all the steps of the validation process must be initiated by an operator, and the operator must still collect the objects after weighing by the checkweigher, transport the objects to an offline static scale and perform the weighing operation. In both cases, the operator must manually collect and record the weight data associated with the offline static weighing operation.

Ultimately, checkweighers must be periodically validated in order to ensure the proper and accurate operation of their weighing function. It is obviously desirable that such validation occurs without any risk of validation process failure. Consequently, it can be understood that a validation system and method that removes the possibility that validation operations may be skipped or performed improperly would also be desirable. Systems and methods of the present invention are useful in this manner.

SUMMARY OF THE GENERAL INVENTIVE CONCEPT

The present invention is directed to automated checkweigher validation systems and methods. Systems and methods of the present invention may minimize or eliminate the need for an operator to perform various validation operation functions. Additionally, systems and methods of the present invention also automate the associated data collection process by transmitting the validation results over established data pathways.

Specific embodiments of the invention may vary in accordance with the nature (e.g., size and weight) of the objects to be weighed by a checkweigher of interest, as well as the velocity at which the object traverses the weighing area of the checkweigher. For example, it would be apparent to one skilled in the art that a light and unstable object traveling at a high velocity will not likely be handled in the same manner as a heavy unstable object traveling at a lesser velocity. In both cases, however, the above-described variation in the characteristics of checkweigher weight sensors will nonetheless lead to erroneous weight readings if periodic validation and correction operations are not employed.

According to one exemplary and basic validation method of the present invention, a random object is removed by an operator from a conveyor leading a line of such objects to a checkweigher, and subsequently placed on a static scale connected to the checkweigher controller. The static scale will transmit the weight of the object to the checkweigher (or to another device). A monitoring device (e.g., a photo eye) located upstream of the checkweigher monitors the location/arrival of objects on the conveyor line and notifies the operator in time for the operator to remove the object from the static scale and place it upstream of the checkweigher so that the checkweigher can weigh the object and associate the measured weight with the weight reported by the static scale. These weights may then be compared to provide the result of the validation process.

In one exemplary semi-automatic embodiment of the present invention, an operator removes a sample object from a conveyor line leading to a checkweigher and places the sample object on a static scale for weighing. The static scale thereafter transmits the weight of the object to the checkweigher (or to another device). However, rather than requiring the operator to subsequently remove the sample object from the static scale and place it back into the conveyor line leading to the checkweigher, as in the previous example, in this embodiment these subsequent removal and replacement steps may be performed automatically by components of an exemplary system of the present invention. Such an embodiment may be particularly beneficial if the gaps between moving objects are small, although the use of such an embodiment is not limited to such a situation.

As an alternative to the semi-automatic method just described, it is also possible that a system of the present invention may function to remove a sample object from a conveyor line leading to a checkweigher and to automatically place the sample object onto a static scale. The static scale thereafter transmits the weight of the object to the checkweigher (or to another device). After static weighing of the object is complete, the operator removes the weighed object and places it back into the flow of objects along the conveyor line for subsequent weighing by the checkweigher and use in validation of the weighing function thereof.

According to an exemplary and fully automatic validation method of the present invention, a random object is automatically removed from a conveyor line leading to a checkweigher by a system of the present invention, and subsequently placed thereby onto a static scale connected to the checkweigher controller. The static scale will thereafter transmit the weight of the object to the checkweigher (or to another device). A monitoring device (e.g., a photo eye) located upstream of the checkweigher monitors the location/arrival of objects on the conveyor line and communicates with the validation system to permit components of the validation system to remove the object from the static scale and place it upstream of the checkweigher so that the checkweigher can weigh the object and associate the measured weight with the weight reported by the static scale. These weights may then be compared to provide the result of the validation process.

As would be familiar to one of skill in the art, different types of objects may be processed by a single checkweigher at different times. As such, it is possible that for a single checkweigher, the validation process for certain objects may be handled automatically according to the present invention while other objects may be handled semi-automatically.

The above-described methods allow a production (real) object to be effectively used as a validation object. Thus, the validation object possesses the same characteristics and produces all the dynamic effects of a real object without interfering with the object flow into and out of the checkweigher or causing potential object flow quality problems (e.g., loss of a simulated validation object downstream).

According to yet another checkweigher validation method of the present invention, a simulated validation object may be created or a real object to be weighed may be tagged or marked, or otherwise made to be readily distinguishable from real objects to be weighed, and used for repeated validation operations over some extended period of time (e.g., until the validation object is no longer useable and must be replaced). For purposes of easy identification, such a validation object may be, for example, provided with a RFID tag, bar code or similar identifier, or may have a unique shape, dimension(s), color or other characteristic(s).

One benefit to this particular validation method is that it does not require the use of a static scale at the checkweigher, as the validation object will have already been weighed and is easily identified. However, such a validation method will require that the validation object be removed from the product stream after being weighed by the checkweigher as part of the validation process.

According to yet another checkweigher validation method of the present invention, one or more additional weighing devices may be placed in line with the checkweigher of interest. This allows for a validating weight of each object to be determined by the scale portions of one or more additional checkweighers after the objects travel through the primary checkweigher.

One benefit of this method is that it allows for the averaging of the collected weights and for an overall more accurate weight measurement. Because no validation objects need to be inserted into or removed from the object flow according to this method, another potential benefit is the lack of impact on the normal object flow or checkweigher operation. Such a method is also capable of detecting a failing scale associated either with the primary checkweigher or one or more validation checkweighers. Hence, this method may further lend itself to achieving higher overall checkweigher operation reliability. It is also recognized, however, that this method may be a more expensive validation solution in some cases.

With respect to any validation method described herein where it is desired or necessary to remove a validation object from the production stream after its weighing by an associated checkweigher, it is possible to locate a selective rejecter downstream of the checkweigher for this purpose. For example, validation objects may be pushed off a downstream conveyor line by such a rejecter and into a receptacle or onto another conveyor that transports the validation objects to a predetermined location.

According to still another method of the present invention, checkweigher validation may be accomplished without weighing a real or simulated validation object with the scale of the checkweigher. Therefore, this method has no, or virtually no, impact on object flow.

Unlike previously described exemplary methods, this method uses a captive sample weight that is located in proximity to the checkweigher. The sample weight may have any suitable shape but, preferably, is spherical to promote motion thereof across the scale of a checkweigher. The sample weight has a known weight and can be moved from a resting position on one side of a checkweigher scale to a second resting position on the other side of the scale. The structure forming the resting areas for the sample weight are not mounted to the scale but rather are mounted to, for example, the frame structure of the checkweigher.

Movement of the sample weight from the first resting position to the second resting position may be accomplished by gravity, via an air jet, or by any other means capable of propelling the sample weight across the checkweigher scale without impacting the object weighing process of the checkweigher. To this end, the sample weight may be moved across the checkweigher scale during a gap in the object flow.

While on the scale, the weight of the sample weight will be determined, collected, and compared to previous weight records of the same sample weight. A variation between a new weight reading and a previous weight reading(s) may be an indication of a change in the characteristics of the weighing sensor (e.g., load cell).

There is also a side benefit associated with methods of the present invention that employ a separate static scale. Particularly, if a discrepancy between weight readings produced by the static scale and the checkweigher is recognized, this discrepancy is indicative of a problem with either the checkweigher or the static scale. Therefore, such methods may also operate to validate the proper operation of the static scale.

While not described in detail herein, it should be apparent to one of skill in the art that the collection of checkweigher validation data may also be used to automatically generate and apply correction factors to the weight readings provided by the checkweigher. Applying such correction factors ensures that the checkweigher will produce highly accurate weight readings, as any changes in weight sensor characteristics will be accounted for.

Either individual object weights or a combined weight of some number of objects can be collected and provided to a data collection system for archiving of performance (validation) data.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1b depicts the exemplary embodiment of FIG. 1 wherein the operator has removed the validation object from the static scale after a static weighing operation and replaced the validation object on the conveyor line;

DETAILED DESCRIPTION OF EXEMPLARY EMBODIMENT(S)

Figure 1:
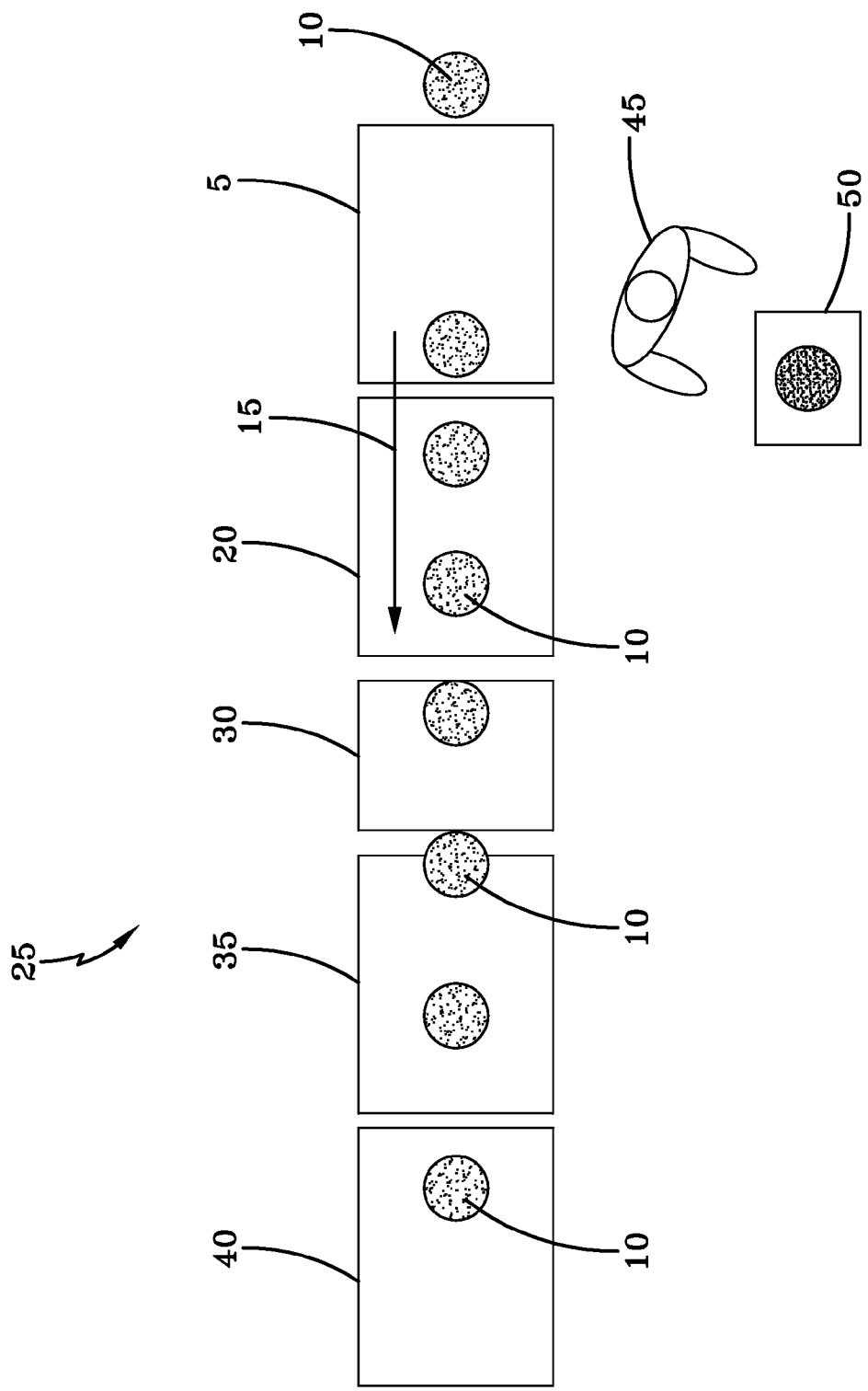
FIG. 1 depicts an exemplary embodiment of the present invention wherein an operator has removed a validation object from a conveyor line and placed the object on a static scale and replaces the validation object on the conveyor line after a static weighing operation.

One exemplary embodiment of a checkweigher validation method of the present invention is represented in FIGS. 1-1b. As shown, a supply conveyor 5 transports objects to be weighed 10 in the direction indicated by arrow 15. The objects 10 are moved onto an in-feed conveyor section 20 of a checkweigher 25, whereafter they are passed over a scale portion 30 of the checkweigher. After passing over the scale portion 30 of the checkweigher 25, the objects 10 are transported away from the checkweigher by an out-feed conveyor section 35 thereof. As would be well familiar to one of skill in the art, the out-feed conveyor section is generally associated with an exit conveyor 40 that will transport the objects 10 to a downstream location.

As depicted in FIG. 1, according to this particular method, an operator 45 removes a random one of the objects 10 from some location upstream of the checkweigher 25 for use in a checkweigher validation operation. This random object then becomes a validation object X.

After removal of the validation object X from the conveyor 5 or in-feed conveyor section 20, the operator 45 places the validation object onto a static scale 50 located near the checkweigher. The weight of the validation object X is determined by the static scale 50, and the weight value is transmitted to the checkweigher or to another device associated with the checkweigher and capable of analyzing the data received from the static scale. This transmission of weight data may occur by wired or wireless means, and may include the use of data interfaces that facilitate communication between the checkweigher (or other device) and the static scale.

Upon completion of the static weighing operation by the static scale 50, the operator removes the validation object X from the static scale and places it upstream of the checkweigher 25 so that validation object will pass over the checkweigher scale 30 and be weighed. A monitoring device, such as a photo eye (not shown), may be located upstream of the checkweigher to monitor the location/arrival of other objects 10 on the conveyor line and to notify the operator in time for the operator to insert the validation object X into a gap between conveyed objects. Such notifications may be, for example, in the form of visual and/or audio ques.

The weight of the validation object X, as measured by the checkweigher 25, is associated with the weight reported by the static scale. These weights may then be compared to determine whether the checkweigher is providing accurate weight readings.

Figure 2:
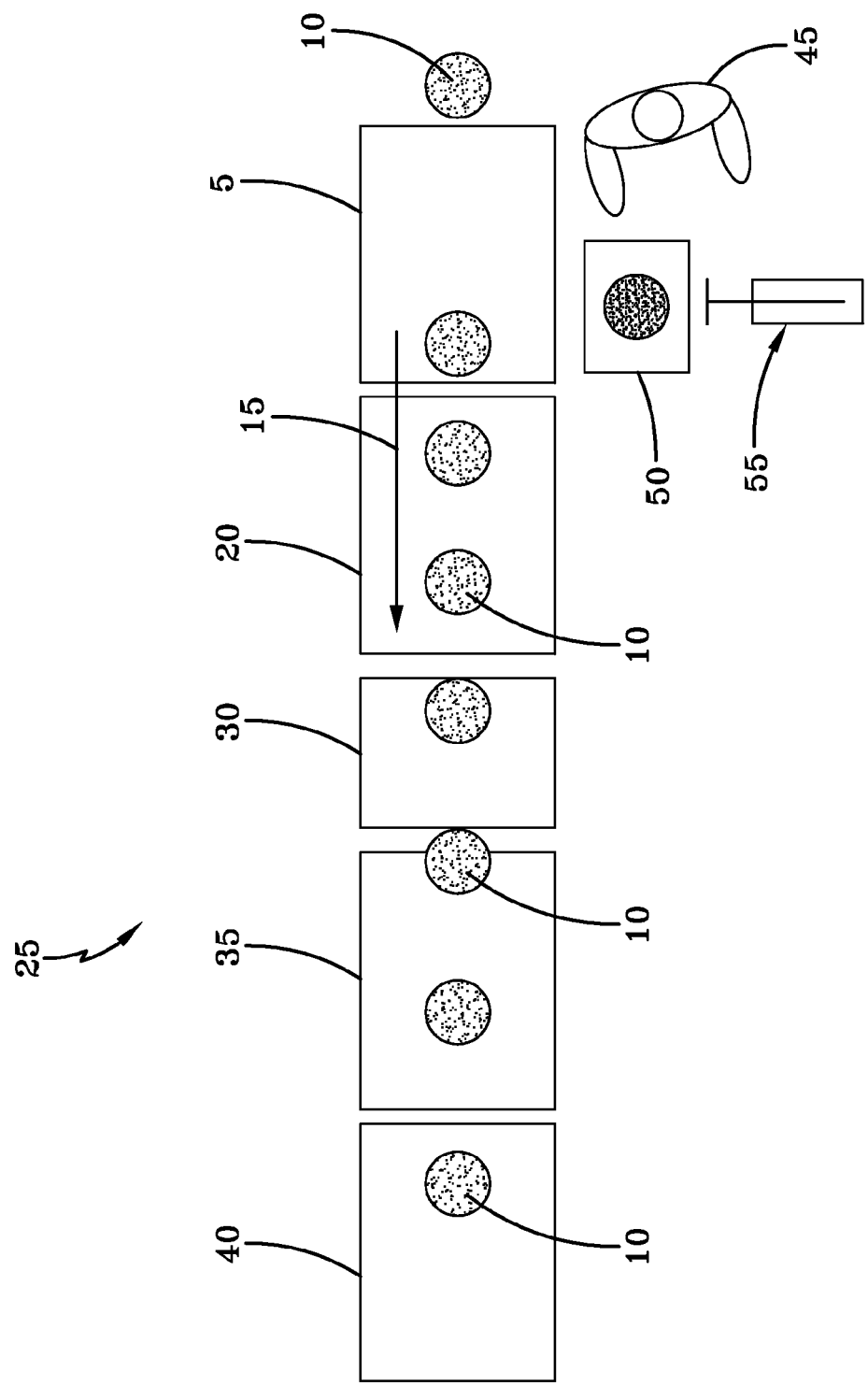
FIG. 2 depicts an exemplary embodiment of the present invention wherein an operator removes a validation object from a conveyor line to a static scale, but the validation object is automatically returned to the conveyor line by a validation system of the present invention after a static weighing operation.

An alternative checkweigher validation method according to the present invention is represented in FIG. 2. As shown, the supply conveyor 5 exit conveyor 35, and checkweigher 25 are again present, as is the static scale 50. Objects to be weighed by the checkweigher 25 are once again transported in the direction of arrow 15, as described above.

According to this particular method, the operator 45 again removes a random one of the objects 10 from some location upstream of the checkweigher 25 for use in a checkweigher validation operation, which random object again becomes a validation object X. The operator 45 again places the validation object onto a static scale 50 located near the checkweigher 25. The weight of the validation object X is again determined by the static scale 50, and the weight value is transmitted to the checkweigher 25 or to another device associated with the checkweigher and capable of analyzing the data received from the static scale.

In this particular method, upon completion of the static weighing operation by the static scale 50, the validation object X is automatically moved by a transfer mechanism 55 from the static scale to a position upstream of the checkweigher 25 so that the validation object will pass over the checkweigher scale 30 and be weighed. Automatic movement of the validation object X from the static scale 50 back to the conveyor line may be accomplished in a number of ways. For example, and as shown, a simple pusher device may be used to transfer the validation object. Alternatively, validation objects X may be moved between these locations by gravity (e.g., on a slide) or by more complex mechanisms, including robotic and other powered mechanisms.

A monitoring device, such as a photo eye, may again be used to trigger the transfer mechanism 55. Alternatively, the transfer mechanism 55 may be actuated by the operator 45, upon a notification from a monitoring device or otherwise.

The weight of the validation object X, as measured by the checkweigher 25, is associated with the weight reported by the static scale 50. These weights may then be compared to determine whether the checkweigher is providing accurate weight readings.

Figure 3:
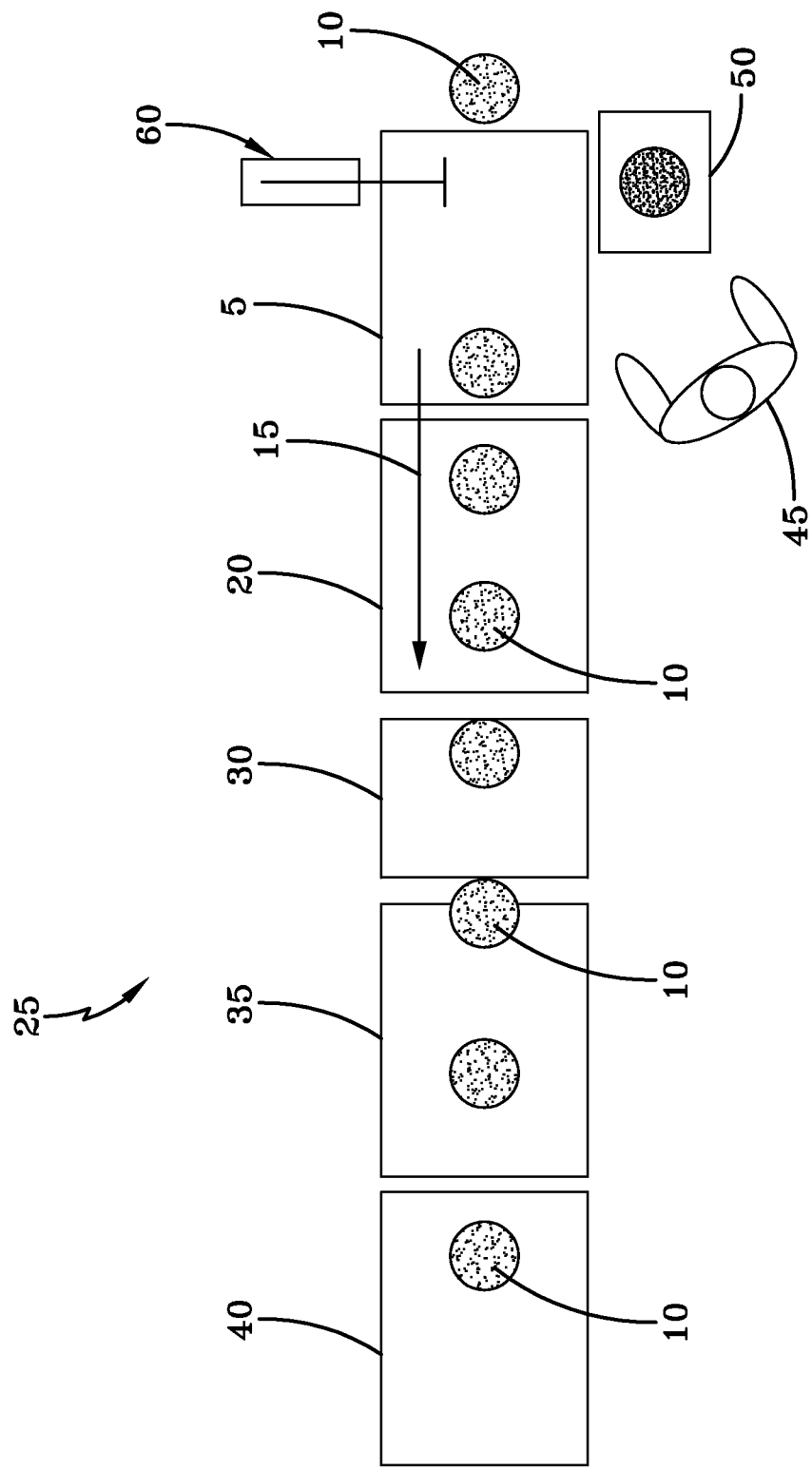
FIG. 3 depicts an exemplary embodiment of the present invention wherein a validation object is automatically removed from a conveyor line and placed on a static scale by a validation system of the present invention, but is returned to the conveyor line by an operator after a static weighing operation.

Another checkweigher validation method according to the present invention is represented in FIG. 3. As shown, the supply conveyor 5, exit conveyor 40, and checkweigher 25 are again present, as is the static scale 50. Objects to be weighed by the checkweigher 25 are once again transported in the direction of arrow 15, as described above.

According to this particular method, a random one of the objects 10 is again removed from some location upstream of the checkweigher 25 to become a validation object X. Unlike the method represented in FIG. 2, however, a validation object X of this embodiment is automatically moved by a transfer mechanism 60 from a conveying position upstream of the checkweigher 25 to a static scale 50 located near the checkweigher. Automatic movement of the validation object X from the conveyor line to the static scale 50 may be accomplished in any of the ways described above with respect to the embodiment of FIG. 2. The weight of the validation object X is again determined by the static scale 50, and the weight value is transmitted to the checkweigher 25 or to another device associated with the checkweigher and capable of analyzing the data received from the static scale.

The system of FIG. 3 will typically place a validation object onto the static scale 50 only if no other validation object X or any other detectable object is already on the static scale. The static scale 50 itself may be used to indicate whether there is an object present thereon. For example, the static scale 50 may be queried by the checkweigher 25 or another device in control of the transfer mechanism 60 to determine if the weight reading of the static scale is zero. Alternatively, other devices such as photo eyes, proximity sensors, etc., may be used for this purpose. Alternatively, the checkweigher could also initiate a controlled re-zero of the static scale before the validation operation is performed.

In this particular method, upon completion of the static weighing operation by the static scale 50, the validation object X is removed from the static scale 50 by the operator 45 and returned to a conveying position upstream of the checkweigher 25 so that the validation object will pass over the checkweigher scale 30 and be weighed. A monitoring device, such as a photo eye, may again be used to alert the operator 45 in time for the operator to properly place the validation object X back into the conveyed line of objects 10.

The weight of the validation object X, as measured by the checkweigher 25, is associated with the weight reported by the static scale 50. These weights may then be compared to determine whether the checkweigher is providing accurate weight readings.

A fully automated checkweigher validation method is also contemplated by the present invention. Particularly in the case of a stable object and/or a checkweigher/conveyor line that does not run at an excessively high speed, the process of removing and returning a random object from/to the object flow with some type of automated transfer mechanism is certainly possible. More specifically, when it is determined that a validation operation is required, a validation object may be automatically placed onto the static scale and then automatically returned to the object flow upstream of the checkweigher after weighing by the static scale is complete.

Figure 4:
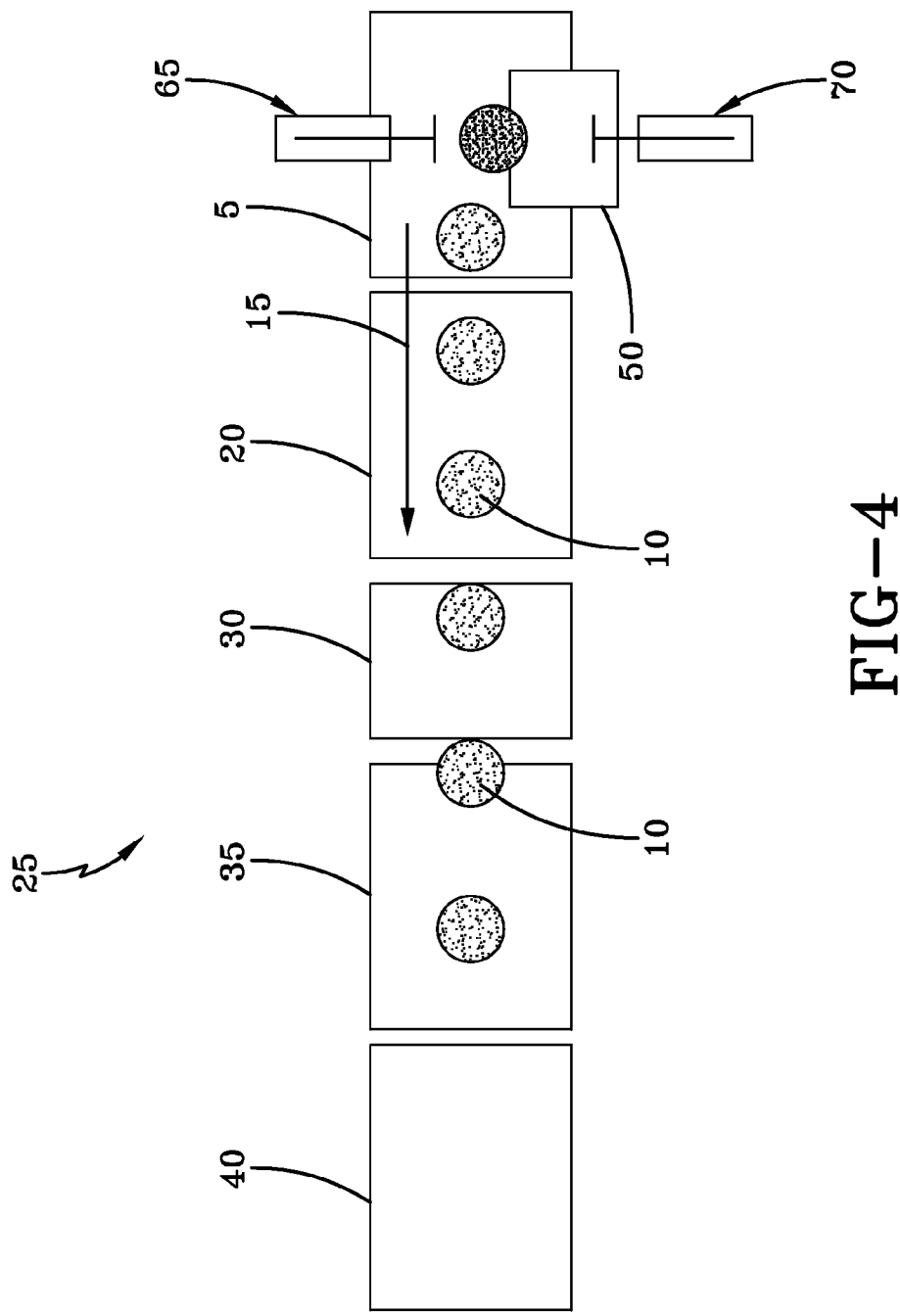
FIG. 4 depicts an exemplary embodiment of the present invention wherein a validation system of the present invention both removes a validation object from a conveyor line to a static scale and replaces the validation object on the conveyor line after a static weighing operation.

One exemplary embodiment of such a fully automatic checkweigher validation method is represented in FIG. 4. As shown, the supply conveyor 5 exit conveyor 35, and checkweigher 25 of the previously described embodiments are again present, as is the static scale 50. Objects to be weighed by the checkweigher 25 are once again transported in the direction of arrow 15, as described above.

According to this particular method, a random one of the objects 10 is again removed from some location upstream of the checkweigher 25 to become a validation object X. A validation object X of this embodiment is automatically moved by a first transfer mechanism 65 from a conveying position upstream of the checkweigher 25 to a static scale 50 located near the checkweigher. Automatic movement of the validation object X from the conveyor line to the static scale 50 may be accomplished in any of the ways described above with respect to the embodiment of FIG. 2. The weight of the validation object X is again determined by the static scale 50, and the weight value is transmitted to the checkweigher 25 or to another device associated with the checkweigher and capable of analyzing the data received from the static scale.

Unlike the methods represented in FIGS. 1-3, however, in this particular method, the validation object X is also automatically removed from the static scale 50 after weighing and returned to a conveying position upstream of the checkweigher 25 by a second transfer mechanism 70. Automatic movement of the validation object X from the static scale 50 to the conveyor line may also be accomplished in any of the ways described above with respect to the embodiment of FIG. 2. The entire process of removing and replacing a validation object is thus automated, eliminating the need for operator involvement.

Like the system of FIG. 3, the system of FIG. 4 will typically place a validation object onto the static scale 50 only if no other validation object X or any other detectable object is already on the static scale. The static scale 50 itself may again be used to indicate whether there is an object present thereon. For example, the static scale 50 may be queried by the checkweigher 25 or another device in control of the second transfer mechanism 70 to determine if the weight reading of the static scale is zero. Alternatively, other devices such as photo eyes, proximity sensors, etc., may be used for this purpose.

After its return to the conveyor line, the validation object will thereafter pass over the checkweigher scale 30 and be weighed as in the previously described embodiments. A monitoring device, such as a photo eye, may be used to trigger the second transfer mechanism 70. Alternatively, the second transfer mechanism 70 may be actuated by the operator 45, upon a notification from a monitoring device or otherwise.

One benefit of the semi-automatic and automatic checkweigher validation methods of the present invention is that no special object, sample weight, puck, etc., is required to perform the validation operation. Rather, the validation object is simply a randomly selected one of the actual objects being conveyed to and weighed by the checkweigher of interest. Additionally, unlike known methods, weight data is collected and transmitted automatically to a centralized system once a validation operation has been performed. No operator intervention is required in this regard.

Nonetheless, in addition to the features/functions described above, embodiments of the present invention may be adapted to return a validation objects from a downstream (post-checkweigher) location to an initial object stream insertion point where, at a later time, the validation object can be once again reintroduced into the object flow. To this end, the validation object may be collected after passing over the checkweigher and returned to its insertion location, such as by a conveyor moving parallel to the checkweigher, a string attached to the validation object, etc. Such mechanisms are well within the purview of one skilled in the art and, therefore, the specific details thereof are not described in detail herein.

It is also possible for a checkweigher to produce a periodic alarm to notify an operator to perform a semi-automatic validation operation, or to trigger an automatic validation operation. Further, if a validation operation fails because, for instance, an operator misses the window within which a validation object can be placed back into the line of conveyed objects, the checkweigher will still handle what was intended to be the validation object like it would any other object on the line, and will reject over and/or underweight objects or objects with identifiable defects and allow objects of proper weight to pass through the checkweigher without any intervention.

As mentioned above, the validation object used in the already described methods has no specific features that would differentiate it from any other object on the line. Therefore, if the checkweigher cannot uniquely match in time the removal of the validation object from the static scale with the same object as it is passed through the checkweigher, the checkweigher may simply ignore the validation step and generate a new validation signal (e.g., alarm) for the operator to comply with. This can be caused to occur if the operator removes the object from the static scale before the checkweigher has indicated it is allowable to do so. This can also be caused to occur if the checkweigher has closed the window of time in which a validation object can weighed by the checkweigher because removal of the validation object from the static scale failed to occur before a flow of new objects is detected by an upstream sensor.

Similarly, if a validation operation is interrupted, the checkweigher may identify this condition and generate a new alarm or some other indicator that signals an operator to perform a validation operation. These signals may continue or recur until the checkweigher validation process is successfully completed or until a certain number of unsuccessful validation attempts have been made. In the latter case, it is also possible to cause the checkweigher to generate another alarm or other indicator that may require stoppage of the associated conveyor line and performance of a traditional (known) sampling process.

As another safeguard, the validation object may be rejected if the static scale determines that the validation object is outside of some predetermined limits necessary to the proper performance of a validation operation. In this case, another validation object will have to be selected. Such a safeguard assures that only validation objects within a certain tolerance of the target weight are used to perform a validation operation.

The above-described methods are generally applicable to checkweigher systems where there is periodically or randomly a sufficient gap in the object flow to permit removal of a validation object from a static scale and replacement of the validation object into the object flow upstream of the checkweigher. It may also be possible to intentionally create such a gap with respect to systems where such a gap would not be naturally occurring.

While the checkweigher validation methods discussed above contemplate the use of actual objects to be weighed as validation objects, other methods of the present invention may employ specialized validation objects. More particularly, a validation object may be created specifically for use in the checkweigher validation process, or an actual object to be weighed by the checkweigher of interest may be altered to function specifically as a validation object. In either case, the validation object is eventually removed from the object stream, as it is not a product/package that may be placed in commerce or otherwise transferred to the same downstream location(s) as normal objects passed through the checkweigher.

In the case of a created validation object, the validation object may be constructed of the same material(s) as the similar objects to be weighed by the checkweigher. Alternatively, the created validation object may be constructed from different material(s), such as a material that will render the created validation object more durable for long term use. In any event, it is the weight of the created validation object that is most important to the checkweigher validation process.

A created validation object may be made readily identifiable and distinguishable from real objects to be weighed in a variety of ways. For example, the overall shape or one or more dimensions (e.g., the height) of the created validation object may differ from a real object. In this case, a photo sensor or another suitable sensor may be associated with the checkweigher and employed to detect the dissimilar dimension (height) of the created validation object so that the checkweigher will pass the created validation object and use its weight reading for checkweigher validation, and so the created validation object may be properly removed from the object flow (such as with a rejecter) once it passes through the checkweigher. In a similar manner, a created validation object may be instead or also of a color that is dissimilar to the color of the real objects to be weighed. In this case, a color sensor may be associated with the checkweigher to identify the created validation object.

As an alternative to, or in conjunction with the above-describe identification techniques, a created validation object may instead/also be otherwise equipped with an identification mechanism such as a bar code and/or a radio frequency identification (RFID) tag.

When a bar code is used, a bar code reader will also be employed to read the bar code before the created validation object reaches the checkweigher so that the checkweigher will pass the created validation object and use its weight reading for checkweigher validation, and so the created validation object may be properly removed from the object flow once it passes through the checkweigher. The created validation object may be provided with a barcode on more than one of its surfaces in case the created validation object becomes reoriented after its placement into the object flow.

When a RFID tag is used, a RFID tag detector will also be employed to detect and activate the RFID tag. The RFID tag will then transmit its embedded information, which information may be received by the checkweigher before the created validation object reaches the checkweigher so that the checkweigher will pass the created validation object and use its weight reading for checkweigher validation, and so the created validation object may be properly removed from the object flow once it passes through the checkweigher. When a RFID tag is used, the tag may also contain specific information about the validation object, such as, for example, one or more specific characteristics of the validation object. One such characteristic is the known weight of the validation object. In this case, the use of such a RFID tag may permit the use of different validation objects having various weights around the target weight and the upper and lower acceptable weights of a given object to be weighed. The use of a RFID tag may further overcome some of the potential issues involved with a bar coded validation object becoming reoriented after its placement into the object flow.

In the case of an altered real object, an object to be weighed may be removed from the checkweigher line or elsewhere and tagged, marked, or otherwise made to be readily distinguishable from real objects to be weighed. An altered real object may be made distinguishable from other real objects by many of the techniques discussed above, such as by changing its color and/or applying a bar code or RFID tag thereto. When one or more of these techniques are used, a suitable detector or sensor may also be employed, as already described above with respect to the use of a created validation object.

Whether the validation object of this embodiment is created or an altered real object, it will have a known weight. Also, whether the validation object of this embodiment is created or an altered real object, the validation object may be used for repeated validation operations over some extended period of time (e.g., until the validation object is no longer useable and must be replaced).

One obvious benefit associated with this checkweigher validation method is that it does not require the use of a static scale at the checkweigher, as the validation object is of a known weight and, therefore, does not have to be weighed prior to being passed through the checkweigher. Additionally, because the validation object does not have to be weighed on a static scale, the validation process can be more easily automated.

This checkweigher validation method can be semi-automatic in nature, with an operator inserting a validation object into the object flow and a device (e.g., reject mechanism) removing the validation object from the object flow after it leaves the checkweigher. Alternatively, this checkweigher validation method may be fully automated by causing the validation object to travel back from a downstream reject point to an initial object stream insertion point where, at a later time, the validation object can be once again reintroduced into the object flow. To this end, the validation object is collected after its downstream rejection and returned to its insertion location, such as by a conveyor moving parallel to the checkweigher, a string attached to the validation object, etc. Such mechanisms are well within the purview of one skilled in the art and, therefore, the specific details thereof are not described in detail herein.

As described above, such a method also requires that the validation object be rejected after passing through the checkweigher. One skilled in the art would be familiar with a variety of rejecter devices that may be suitably employed for this purpose. A counter check sensor may also be located downstream of the rejecter, and/or a reject verification sensor could be used, to verify that the validation object has in fact been removed from the object flow.

Figure 5:
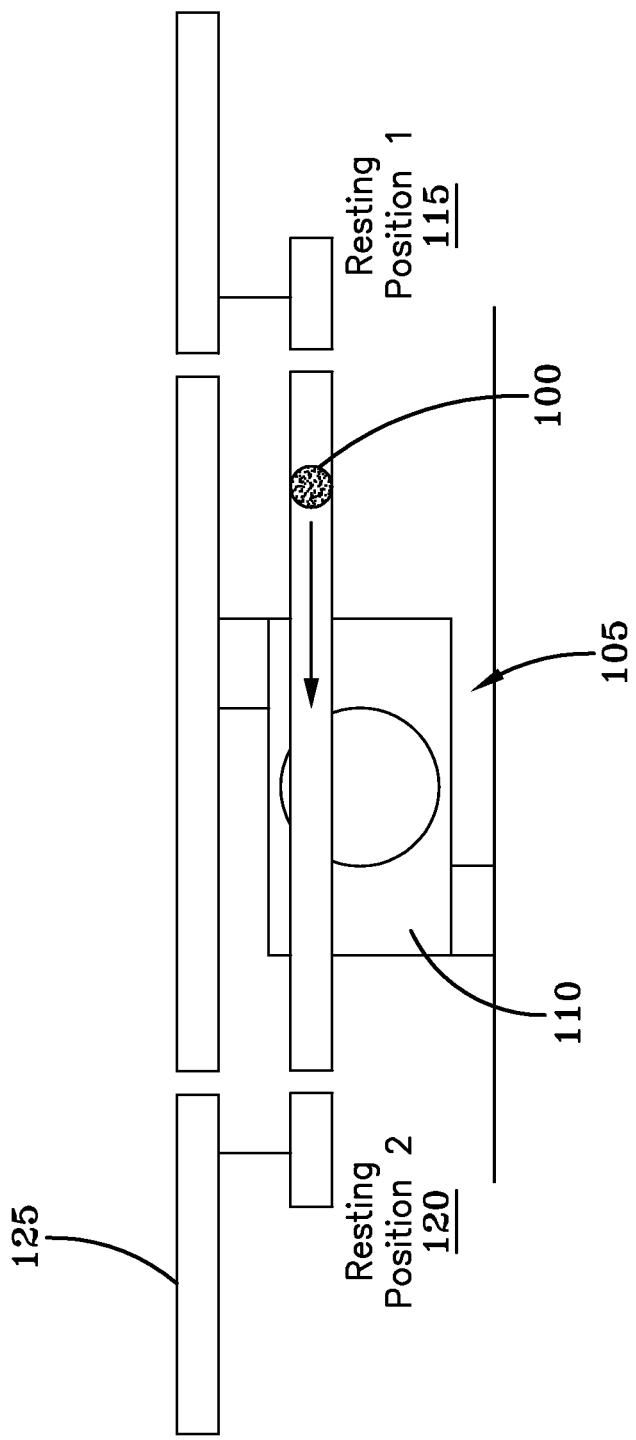
FIG. 5 depicts an exemplary embodiment of the present invention wherein a captive sample weight is located in proximity to a checkweigher scale and adapted for movement from first resting position, across the scale of a checkweigher, to a second resting position.

Yet another embodiment of a checkweigher validation method is represented in FIG. 5. By this method, checkweigher validation may be accomplished without weighing a real or specialized validation object with the scale of the checkweigher.

Unlike previously described exemplary methods, this method uses a captive sample weight 100 that is located in proximity to the checkweigher of interest 105. Passing the sample weight 100 over the checkweigher scale 110 will effectively perform the checkweigher validation process.

The sample weight 100 may have any suitable shape but, preferably, is spherical in shape to promote motion thereof across the scale 110 of the checkweigher 105. The sample weight 100 has a known weight and can be moved from a first resting position 115 on one side of the checkweigher scale 110 to a second resting position 120 on the other side of the scale. The structure forming the resting areas for the sample weight 100 are not mounted to the scale 110 but rather are mounted to, for example, the frame structure 125 of the checkweigher.

Movement of the sample weight 100 from the first resting position 115 to the second resting position 120 may be accomplished by gravity, via an air jet (not shown), or by any other means capable of propelling the sample weight across the checkweigher scale 110 without impacting the object weighing process of the checkweigher 105. To this end, the sample weight 100 may be moved across the checkweigher scale 110 during a gap in the object flow.

A variety of safeguards may be associated with this validation method. For example, if the newly determined weight of the sample weight falls outside of some set tolerance range, then an alarm may be generated to compel an operator to either rezero the scale 110 if no scale rezeroing has been performed for an extended period of time, or to recalibrate the scale if an accurate rezeroing has been performed within a set period of time.

If rezeroing of the checkweigher scale 110 has been regularly performed, then deviation of the measured sample weight from the predefined tolerance range may be used to calculate a weight correction factor that will move the checkweigher scale readings back within known limits. This process may be generally referred to as an intermediate weight calibration. Since the intermediate weight calibration is established based on only one validation run of the weight sample, the checkweigher controller can apply different strategies to establish a valid correction factor. For example, if gaps between conveyed objects to be weighed occur often, the checkweigher may decide to repeat the validation run of the sample weight some number of times over a settable period of time. This will allow a statistically valid mean value of the sample weight to be established, as well as the calculation of a more accurate correction factor. The correction factor may always be referenced to the last system calibration If gaps between conveyed objects do not occur often, as described above, the checkweigher may elect to bypass a full correction operation and instead use only a settable percentage of the otherwise calculated full correction of the package weight. This prevents undesirable correction swings if the weight of the sample weight from a validation run changes considerably in one direction or the other (i.e., has a large standard deviation). Alternatively, a checkweigher may also apply a combination of both methods depending on current object flow on the production line.

Sensors may be used to detect to presence of the sample weight 100 at each of the first and second resting positions 115, 120, as well as the point where the sample weight enters the checkweigher scale 110 just before being weighed. Other controls may be provided to set the speed at which the sample weight 100 passes over the scale 110 to assure that the sample weight traverses the scale for substantially the same amount of time as an object to be weighed. This allows the use of the same filters, etc., to be used by the checkweigher controller.

One variation (not shown) of a horizontally traveling sample weight is to deposit a sample weight to a checkweigher scale via a vertical or diagonal movement from an overhead resting place. Such movement results in a depositing and lifting of the sample weight onto and from the checkweigher scale. The depositing process can be performed by a variety of techniques, including but not limited to the use of motorized, lever, and slide mechanisms. Some of these techniques are already used in automated scale calibration systems, where a series of weights can be deposited onto the scale.

While certain embodiments of the present invention are described in detail above, the scope of the invention is not to be considered limited by such disclosure, and modifications are possible without departing from the spirit of the invention as evidenced by the following claims:

What is claimed is:

1. A method of checkweigher performance validation, comprising:
    removing a selected object from a flow of objects being conveyed toward a checkweigher to be validated and onto a static scale, said selected object being considered a validation object;
    using said static scale to weigh said validation object;
    removing said validation object from said static scale and returning said validation object to a conveying position upstream of said checkweigher;
    weighing the validation object with said checkweigher as said validation object passes over a scale portion thereof; and
    comparing the weight of the validation object as determined by the checkweigher to the weight of the validation object as determined by the static scale to determine if said checkweigher is providing accurate weight readings.

2. The method of claim 1, wherein a transfer mechanism is located along the path of travel of said objects to be weighed and upstream of said checkweigher, said transfer mechanism adapted to move a selected object from a flow of said objects onto said static scale.

3. The method of claim 2, wherein said transfer mechanism is a pusher device.

4. The method of claim 1, wherein said validation object is transferred to said static scale by gravity.

5. The method of claim 1, wherein said static scale transmits a signal indicative of the presence of an object on a load receiving portion thereof, and said validation object is not transferred to said static scale unless said signal indicates that no object is present.

6. The method of claim 1, wherein said static scale is re-zeroed prior to transfer of a validation object thereto.

7. The method of claim 1, wherein said checkweigher is used to initiate a re-zeroing of said static scale.

8. The method of claim 1, wherein said static scale transmits a weight value of said validation object to a device capable of analyzing said weight value.

9. The method of claim 8, wherein said device capable of analyzing said weight value is the checkweigher to be validated.

10. The method of claim 1, wherein said validation object is returned to a conveying position upstream of said checkweigher by a person.

11. The method of claim 1, wherein the timing of the transfer of said validation object from said static scale to a conveying position upstream of said checkweigher is determined by a monitoring device located upstream of said checkweigher.

12. The method of claim 11, wherein said monitoring device is a photo eye.

13. A method of checkweigher performance validation, comprising:
    locating a static scale along a path of travel of objects being conveyed toward a checkweigher to be validated, said static scale located upstream of said checkweigher;
    providing a transfer mechanism along the path of travel of said objects to be weighed and upstream of said checkweigher, said transfer mechanism adapted to move a randomly selected object from a flow of said objects onto said static scale, said selected object being considered a validation object;
    using said static scale to weigh said validation object;
    transmitting a weight value of said validation object from said static scale to a device capable of analyzing said weight value;
    removing said validation object from said static scale and returning said validation object to a conveying position upstream of said checkweigher;
    weighing the validation object with said checkweigher as said validation object passes over a scale portion thereof; and
    comparing the weight of the validation object as determined by the checkweigher to the weight of the validation object as determined by the static scale to determine if said checkweigher is providing accurate weight readings.

14. The method of claim 13, wherein said transfer mechanism is a pusher device.

15. The method of claim 13, wherein said validation object is transferred to said static scale by gravity.

16. The method of claim 13, wherein said static scale transmits a signal indicative of the presence of an object thereon, and said validation object is not transferred to said static scale unless said signal indicates that said static scale is empty.

17. The method of claim 13, wherein said static scale is re-zeroed prior to transfer of a validation object thereto.

18. The method of claim 17, wherein said checkweigher is used to initiate a re-zeroing of said static scale.

19. The method of claim 13, wherein said device capable of analyzing said weight value is the checkweigher to be validated.

20. The method of claim 13, wherein said validation object is returned to a conveying position upstream of said checkweigher by a person.

21. The method of claim 13, wherein the timing of the transfer of said validation object from said static scale to a conveying position upstream of said checkweigher is determined by a monitoring device located upstream of said checkweigher.

22. The method of claim 21, wherein said monitoring device is a photo eye.

23. A system for validating the performance of a checkweigher, comprising:
    a transfer mechanism located along the path of travel of said objects to be weighed and upstream of said checkweigher, said transfer mechanism adapted to move a randomly selected object from a flow of said objects onto a static scale, said selected object being considered a validation object;
    a static scale located upstream of a checkweigher to be validated and positioned to receive validation objects from said transfer mechanism, said static scale adapted to weigh received validation objects and to transmit weight readings associated with said received validation objects;
    a means for removing said validation object from said static scale and returning said validation object to a conveying position upstream of said checkweigher such that said validation object will pass over said checkweigher and be weighed by a scale portion thereof; and
    a device adapted to compare validation object weight readings received from said static scale with validation object weight readings from said checkweigher to determine if said checkweigher is providing accurate weight readings.

24. The system of claim 23, wherein said device that compares weight readings is the checkweigher.

25. The system of claim 24, wherein weight readings from said static scale are transmitted to an intermediate device before being transferred to the checkweigher.

26. The system of claim 23, wherein said transfer mechanism is a pusher device.

* * * * *